United States Patent [19]
Hecht et al.

[11] Patent Number: 5,739,527
[45] Date of Patent: Apr. 14, 1998

[54] NEAR-FIELD OPTICAL MICROSCOPE FOR ANGLE RESOLVED MEASUREMENTS

[75] Inventors: Bert Hecht, Adliswil; Harald Heinzelmann, Basel; Lukas Novotny, Meilen; Wolfgang Pohl, Adliswil, all of Switzerland

[73] Assignee: International Business Machines Corporation, Armonk, N.Y.

[21] Appl. No.: 635,943

[22] PCT Filed: Oct. 4, 1993

[86] PCT No.: PCT/EP93/02713

§ 371 Date: Apr. 25, 1996

§ 102(e) Date: Apr. 25, 1996

[87] PCT Pub. No.: WO95/10060

PCT Pub. Date: Apr. 13, 1995

[51] Int. Cl.[6] .................................... H01J 3/14
[52] U.S. Cl. .................................... 250/234; 250/216
[58] Field of Search .................................... 250/234, 235, 250/216, 227.11, 227.2, 227.24, 227.26, 306, 307; 356/372, 376, 387; 385/12, 13

[56] References Cited

U.S. PATENT DOCUMENTS

| | | | |
|---|---|---|---|
| 5,018,865 | 5/1991 | Ferrell et al. | 250/227.11 |
| 5,294,790 | 3/1994 | Ohta | 250/216 |
| 5,410,151 | 4/1995 | Buckland | 250/227.26 |
| 5,539,197 | 7/1996 | Coujon et al. | 250/216 |

FOREIGN PATENT DOCUMENTS

| | | |
|---|---|---|
| 0426559 | 5/1991 | European Pat. Off. . |
| 0426571 | 5/1991 | European Pat. Off. . |
| 2685789 | 7/1993 | France . |
| 05203879 | 8/1993 | Japan . |

OTHER PUBLICATIONS

De Fornel et al., "An Evanescent Field Optical Microscope," Proc. SPIE: Optical Storage and Scanning Technology, vol. 1139, Apr. 1989, pp. 77–84.

*Primary Examiner*—Edward P. Westin
*Assistant Examiner*—John R. Lee
*Attorney, Agent, or Firm*—Stephen S. Strunck

[57] ABSTRACT

The invention relates to a near-field optical microscope, in particular to a scanning near-field optical microscope (SNOM), comprising means for determining the intensity of light emerging from the near-field at a direction differing from the direction perpendicular to the surface of the sample to be examined, preferably emerging at an angle θ larger than the critical angle. The invention allows an accurate control of the distance between the probing tip of the SNOM and the sample by using the measured intensity in a feedback loop.

14 Claims, 4 Drawing Sheets

NEAR-FIELD OPTICAL MICROSCOPE FOR ANGLE RESOLVED MEASUREMENTS

The invention relates to a near-field optical microscope, in particular to a scanning near-field optical microscope (SNOM). Especially, it concerns an aperture scanning optical microscope (a-SNOM).

BACKGROUND OF THE INVENTION

Near-field optical microscopes are well known in the art. A first, more theoretical proposal was made by E. A. Synge, "A Suggested Method for Extending Microscopic Resolution into the Ultra-Microscopic Region" in Phil. Mag. 6 (1928) p. 356–362. Later, J. A. O'Keefe, "Resolving Power of Visible Light" in J. Opt. Soc. Am., Vol. 46, No. 5, May 1956, p. 359, pointed out that the realization of the proposal was rather remote in view of the—at the time—still unresolved difficulty of providing scanning motion over the minute distances involved. Yet the basic idea was further pursued as evidenced by the paper by E. A. Ash and G. Nicholls, "Super-Resolution Aperture Scanning Microscope" in Nature, Vol. 237, No. 5357, Jun. 30, 1972, pp. 510–515.

All of these proposals used a pinhole in a thin membrane as the aperture. The requirement to place the surface to be inspected at a distance from the membrane that is approximately equal to the diameter of the aperture implied the limitation that only objects could be inspected that would have a surface flatness significantly better than an applied optical wavelength.

The first practical realization of a scanning near-field optical microscope was reported by W. D. Pohl in EP-A-0 112 401 (1982). Here, the aperture is implemented as a sharply pointed optically transparent body covered with an opaque layer into which an opening is formed at the apex of the body, the opening having a diameter small compared to the wavelength of the light used.

The name scanning near-field optical microscope (SNOM) denotes a whole variety of near-field devices, and for the sake of information, the following papers are made of reference, all relating to theoretical and/or practical details of the present state of the art of near-field optical microscopy:

U. Dürig, D. W. Pohl, F. Rohner in: J. Appl. Phys., Vol. 59, No. 10, 15 May 1986, pp. 3318–3327.

T. Takase et al., U.S. Pat. No. 5,138,159

D. Courjon, J. M. Vigoureux, M. Spajer, K. Sarayeddine, S. Leblanc in: Applied Optics, Vol. 29, No. 26, 10 Sep. 1990, pp. 3734–3740.

R. C. Reddick, R. J. Warmack, D. W. Chilcott, S. L. Sharp, T. L. Ferrell in: Rev. Sci. Instr., Vol. 61, No. 12, Dec. 1990, pp. 3669–3677.

E. Betzig, J. K. Trautman in: Science, Vol. 257, 10 Jul. 1992, pp. 189–195.

The classical scanning near-field optical microscope employs a tiny aperture with an entrance pupil diameter that is small with respect to the wavelength of the light used for illuminating the object to be inspected. Within the class of SNOMs, it is therefore known as aperture-scanning near-field microscope (a-SNOM). Directed at the aperture is a laser beam of which a minute part passes to impact the surface of the object. If the object is placed from the aperture at a distance which is also small compared to the wavelength, that is, in the near-field, the light reflected by, or transmitted through, the object can be collected. The transmitted light is collected at an axis perpendicular to the sample surface and opposite of the aperture. In U.S. Pat. No. 5,138,159, the use of a concave mirror having a central bore for the laser beam is described for collecting the reflected light and for focussing it at a detector placed at the opposite side of the sample plane. The detected light is processed to yield an image of the surface investigated. Presently, a-SNOMs reach lateral resolutions of about λ/20 with visible light.

The potential of the various SNOM techniques as pad of high density storage devices has been pointed out, for example, in the European patent application EP-A-0 437 170.

Being subject to a periodic modulation probably caused by interference, the detected light intensity of the described a-SNOM is, however, insensitive to variations in the distance between tip and sample. It is therefore difficult to use the measured signal to control the approach and distance of the tip and sample.

The basis of operation of a second type of SNOM, the conventional scanning tunneling optical microscope (STOM), as described in the Courjon et al. reference and also known under the name photon scanning tunneling microscope (PSTM), as described in the above-cited Reddick et al. reference and also in the patent U.S. Pat. No. 5,018,865, is the sample-modulated tunneling of normally internally reflected photons to a sharply pointed optically transparent tip. The source of the photons is the evanescent field produced by the total internal reflection of a light beam from the sample surface.

An internal reflection is caused by placing the sample surface at the hypothenuse face of a total-reflection prism. The light beam enters perpendicular to one of the side faces of the prism to be totally reflected by the hypothenuse face. In the PSTM, described in the European patent application EP-A-0 426 571, the prism has been replaced by a hemisphere.

The spatial variations in the evanescent field intensity form the basis for imaging. They essentially provide an exponentially decaying waveform normal to the sample surface. Photons tunneling from the total internal reflection surface to the tip are guided to a suitable detector which converts the light flux to an electrical signal. The PSTM detects a signal only when the tip is placed within the decay length of the evanescent wave, allowing an accurate distance control.

One shortcoming of the PSTM relates to the illumination of the sample: In contrast to the a-SNOM, the whole sample is irradiated throughout the total measuring time. Thus, the probability of damage through heating or other effects of the light is increased. Further, the PSTM shows an inferior lateral resolution compared to an a-SNOM, due to the use of a transparent optical probe tip. One way of improving this resolution is to cover the tip of a PSTM with an opaque material leaving only a tiny aperture to collect the light from a well-defined spot of the sample. However this is at the cost of the detected light intensity.

It is therefore an object of the present invention to improve the known neapfield microscopes. In particular, the new invention aims at eliminating the described shortcomings and to provide an a-SNOM with an improved distance control. It is a further object of the invention to broaden the scope of application for near-field optical microscopy.

SUMMARY OF THE INVENTION

The present invention provides a neapfield optical microscope with means to detect the intensity of light transmitted through a sample and emerging from the near-field at an angle θ substantially differing from the direction perpendicular to a plane defined by the sample, preferably at an angle θ larger than the critical angle $\theta_c$. The invention introduces angle-resolved measurement in near-field microscopy, in particular at a range of angles hitherto not exploited by any type of microscopy.

Before explaining the invention in more details, first, the concept of a critical angle is described. Though this concept is well known, misinterpretations might arise from incoherent definitions, occasionally found in the art. A critical angle is observed when light passes a boundary between two media with different indices of refraction, e.g. $n_1$ and $n_2$, respectively, with $n_1 < n_2$. Any incident light beam which passes the boundary coming from the less dense medium ($n_1$) is refracted in the denser medium ($n_2$) at an angle smaller as or equal to the critical angle. The sine of the critical angle $\theta_c$ equals $n_2/n_1$. The angles of incidence and of refraction are both measured with regard to the normal of the boundary, i.e. with regard to an axis perpendicular to the boundary at the spot at which the beam meets the boundary. Thus, according to the law of classic ray optics, the emerging of light into a cone limited by the solid angle defined by $\theta_c$ and the boundary between the two media is forbidden. In near-field optics, however, this restriction is found to be less stringent and the current invention discloses means to detect light emerging at angles larger than $\theta_c$. The angle θ defines the direction of observation, taking into account, that any detector has a finite area sensible for measuring. Thus, the intensity of light measured is the one emerging at a solid angle from the near-field, said solid angle being defined by the sensible area of the detector with θ at its center. In accordance, a direction is defined as being substantially differing from the direction perpendicular to the sample plane, if this direction is not within the solid angle of observation as described above.

Referring now to further details of the invention, the new microscope comprises sample carrying means having a face onto which the sample is placed during a measurement. In a preferred embodiment of the invention, the sample carrying means are made from a transparent material and formed to let the light, emerging from the sample area at angles θ larger than the critical angle $\theta_c$, propagate away from said area towards light detecting means. As the fraction of light emerging into the classically forbidden area is already small, it is important to avoid a further loss of intensity at the boundary between the sample carrying means and the light detecting means.

Therefore, the boundary of the sample carrying means are either tilted at an angle, securing that light emerging from the angle (or range of angle) to be measured meets the boundary substantially perpendicular, or connected to the light detecting medium through an intermediate medium with an index of refraction equal to or greater than the index of refraction of the sample carrier.

Advantageously, the sample carrying means comprise a hemisphere with its flat face attached to the site of the sample within the range of the near-field. Treating the site of the near-field as a point source of radiation, the curvature of the other face of the hemisphere secures that light emerging from the near-field propagates perpendicular with regard to said other face, provided that the site of the near-field is centered at the flat face. The hemispherical shape of the sample carrier allows an arbitrary positioning of the light detecting means at any angle θ or φ, with φ being an arbitrary angle in a plane parallel to the flat face and, thus, to the surface of the sample (azimuth angle). To fully exploit the hemisphere, it has to be accompanied by either a moveable light detector which can be placed at any point or the hemisphere, or by a detector array covering at least a pad or the curved face or the hemisphere.

In most relevant cases, however, the measurement will be restricted to a smaller range of θ and φ typically, most of the radiation emerging into the forbidden area is confined to a range of 20 degrees above the critical angle. Consequently, the sample carrying means can be either shaped as a spherical section, or, by giving up the curved outer face, as a prism, appropriately chosen to let the light, emerging from the preferred range of angles, propagate to the detector. Again, either an array of detectors or at least one moveable detector is used in these embodiments of the invention, if a larger range of angles θ or φ should be covered.

It might be particularly useful to form one of the described sample carrying means similar to or as a part of a standard optical stage facilitating the installation of the device in other, non near-field types of optical microscopes.

Further, it is easily possible to combine the measurement of light emerging at angles θ larger than the critical angle $\theta_c$ with a measurement of the light transmitted perpendicular to the sample plane as known front SNOM techniques or with a measurement of light emerging at a direction anywhere else within the classically allowed cone, i.e. the cone which has $\theta_c$ as a limiting angle. Additional information about the sample can be obtained by comparing different polarization modes, such as s- and p-polarised light, i.e. those directions of polarisation parallel and perpendicular to the plane defined by the direction of the normal to the the surface of the sample and the direction of observation, i.e. θ and φ. The sensitivity of a measurement is further improved by adding (or subtracting) the light intensity as being measured at different directions and, especially, by letting the light, emerging at different angles, interfere or superpose in a phase sensitive manner by applying mirrors, beamsplitters, phase shifters, and other means known to a skilled person.

It is further found that the intensity of the light emerging from the near-field site into the forbidden area varies unambiguously and more sensitively with the distance between near-field generating means and the sample site than does the transmitted light detected by known SNOM devices. The light detected by the new device can, thus, preferably be used to provide an approach and a distance control between the near-field generating means and the sample area. A distance control employing a feedback loop to keep the light intensity at a constant value is known as such from several PSTM-related publications.

The foregoing and other objects, features and advantages of the invention will be apparent from the following, more particular description of preferred embodiments of the invention, as illustrated by the accompanying drawings.

DESCRIPTION OF THE DRAWINGS

The invention is described in several examples below with reference to the following drawings.

EXAMPLES OF THE INVENTION

Figure 1:
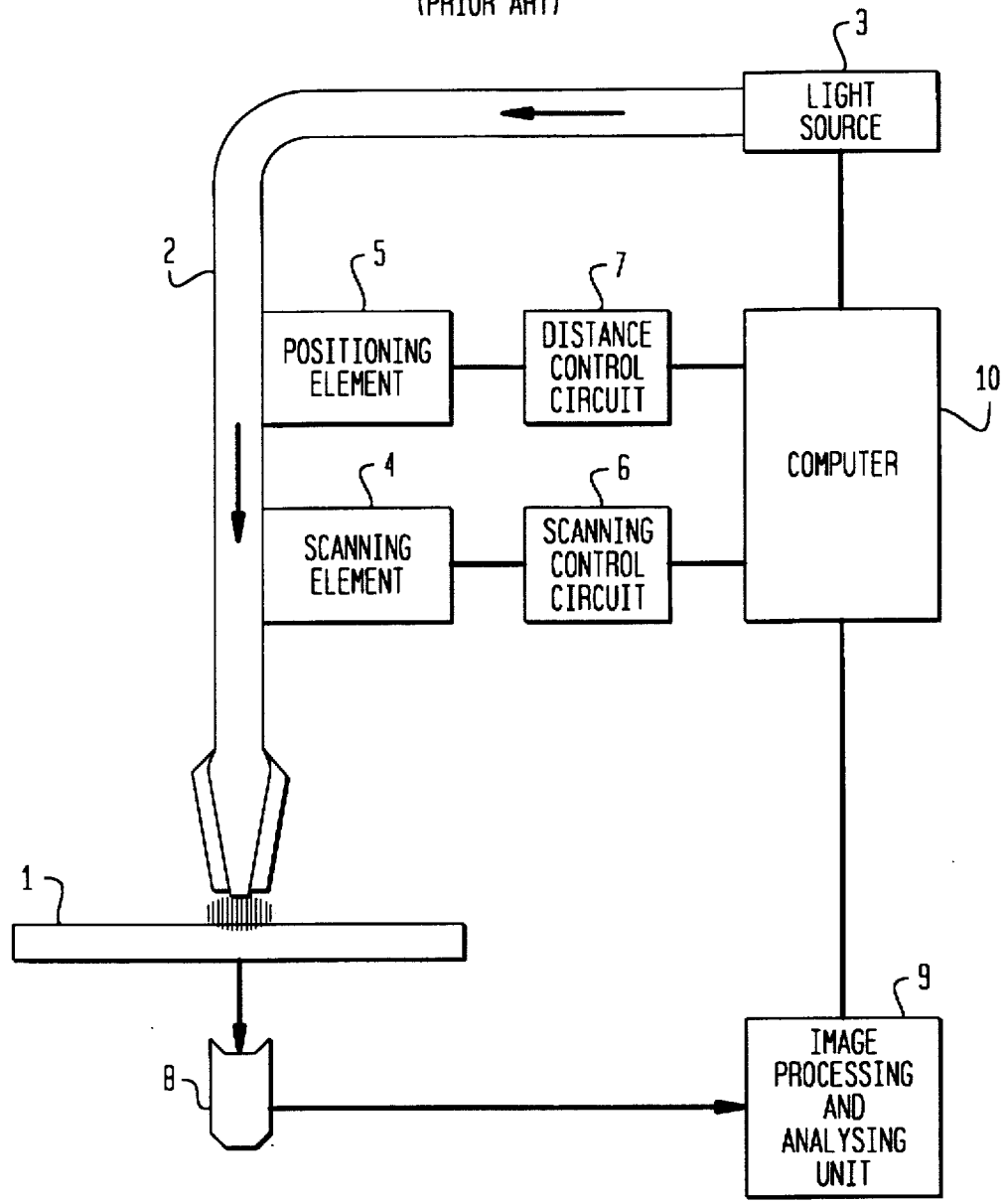
FIG. 1 illustrates schematically the basic elements of a known near-field optical microscope (a-SNOM).

Referring to FIG. 1, the basic elements of a known scanning near-field optical microscope (SNOM) are shown.

A SNOM comprises a a transparent sample carrier 1, usually made from glass or quartz, a tapered optical fiber 2 fabricated, for instance, by etching a standard optical fiber in a KOH solution, and cladding it with an opaque material, such as aluminum. The fiber 2 has an uncovered apex, which serves as an aperture. Connected to the optical fiber is a light source 3 able to emit intense radiation. Suitable light sources are different types of lasers including laser diodes. Measurements according to the following examples of the invention are made with an argon laser emitting light at 488 nm.

Also attached to the fiber 2 are positioning elements 4, 5 of piezoelectric material to finely move the tip of the fiber in three dimensions. The positioning elements are controlled by electrical signals generated by a distance control circuit 6 and a scanning control circuit 7, respectively. The Z positioning element 4 enables a setting of the tip to a predetermined height above the surface of a sample. The X-Y positioning element 5 is used to move the tip in a direction parallel to the surface of a sample. The positioning elements are supported by mechanical actuators (not shown) driven by a stepping motor, a DC motor, or by hand for a coarse positioning of the sample.

A light detector 8, such as a photomultiplier, a photodiode, or a charge coupled device, is positioned at the opposite side of the sample carrier 1, along the axis of the tip. Frequently, the detector 8 comprises an optical microscope mounted in front of the light sensing element. In the following examples, a photomultiplier is used to measure the intensity of the light. The light detector is connected to an image processing and analyzing device 9. All important control units of the SNOM are monitored and programmed by suitable microprocessing and computing means, combined for the purpose of FIG. 1 into a single computer unit 10.

A sample to be examined is placed on the sample carrier 1. After a first coarse positioning, the tip of the fiber 2 is finely moved into the proximity of the surface of the sample until the sample lies within the optical near-field. The optical near-field is generated by passing a light beam through the optical fiber. The light emitted from the tiny aperture at the apex of the tip forms a near-field, which decays within the length comparable lo the dimensions of the aperture (20–50 nm). The light transmitted through the sample and the sample carrier in substantially perpendicular direction is collected by the light detector 8 and converted into electrical signals which are processed by the image processing device 9 into data to be displayed. By scanning the sample in horizontal directions, a complete picture of its surface is obtained.

Concerning the general elements of a near-field optical microscope, the description of the following embodiments of the invention refers back to FIG. 1.

Figure 2A:
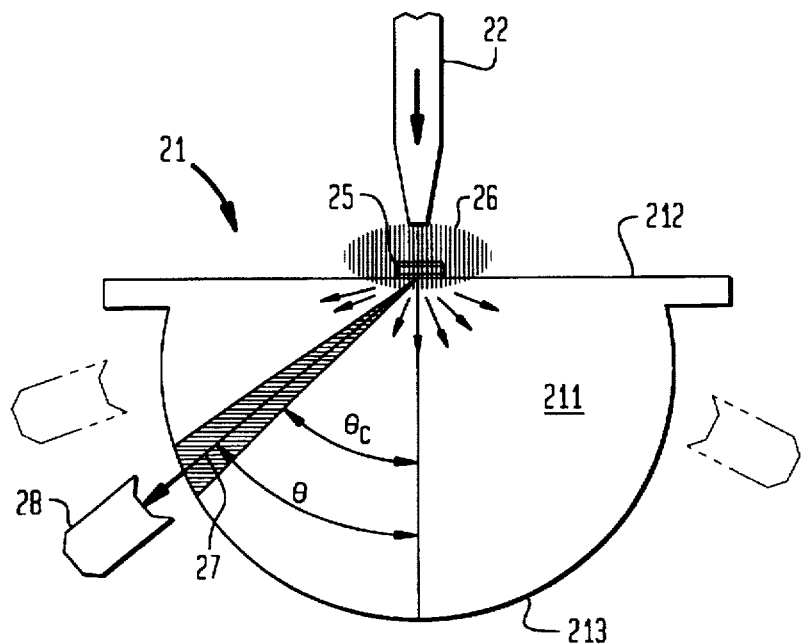
FIGS. 2A, B show the basic elements of two variants of a first preferred embodiment of the invention.

According to a first embodiment of the invention, as shown in FIG. 2A, the sample carrier 21 comprises a hemisphere 211. The sample 25 is placed at the center of the flat face 212 of the hemisphere 211 underneath the tip of the tapered optical fiber 22. In contrast to the known SNOMs, as described above, a detector 28 is situated to collect light emerging from the near-field zone 26 at an off-axis angle, in particular at an angle $\theta$ larger than the critical angle $\theta_c$. As indicated by the drawing, light emerges from the near-field zone 26 into a larger cone than the one limited by the critical angle, and the detector 28 may be placed at various positions.

At a distance comparable to the wavelength of the applied light, only the far-field component of the light remains. The sample carrier 21 serves as a propagation medium for this far-field component. Its hemispherical shape ensures that the far-field component meets the boundary 213 at a right angle, passing it with only minor internal reflection. In the described embodiment, the detector 28 is placed close to the boundary to avoid a further dampening of the intensity of the light. However, it is possible to replace the detector at said position by an optical fiber guiding the collected light towards a detector located at a distance. This arrangement becomes important in case that the dimensions of the sample carrier 21 prevent the direct coupling of comparatively large detecting means 28.

Referring still to FIG. 2A, a hatched area 27 indicates the preferred range of the angle $\theta$ within the scope of the current invention spanning approximately 20 degrees.

Figure 2B:
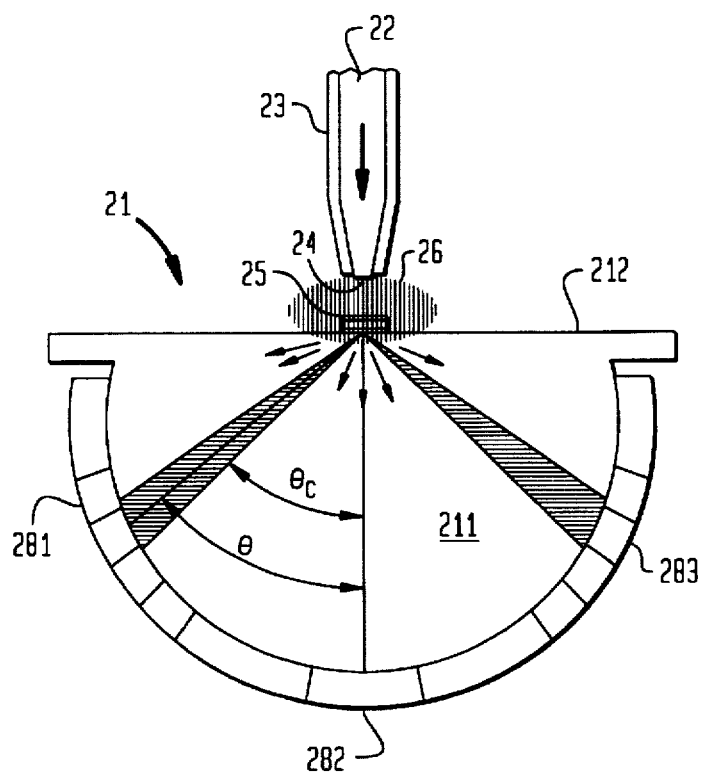

In a variant of the first embodiment, as shown in FIG. 2B, the uncovered tip of the tapered fiber is replaced by a tip coated with aluminum 23. A tiny apedure 24 is left to generate the near-field at the site of the sample. This embodiment provides an enhanced resolution in comparison to the first variant, as the uncoated tip has only an ill-defined aperture. Further, arrays 281–283 of light detectors allows the detection of light emerging at different angles $\theta$, both larger and smaller than $\theta_c$, extending the scope of activity of the new microscope to simultaneous angle-resolved measurement.

Figure 3A:
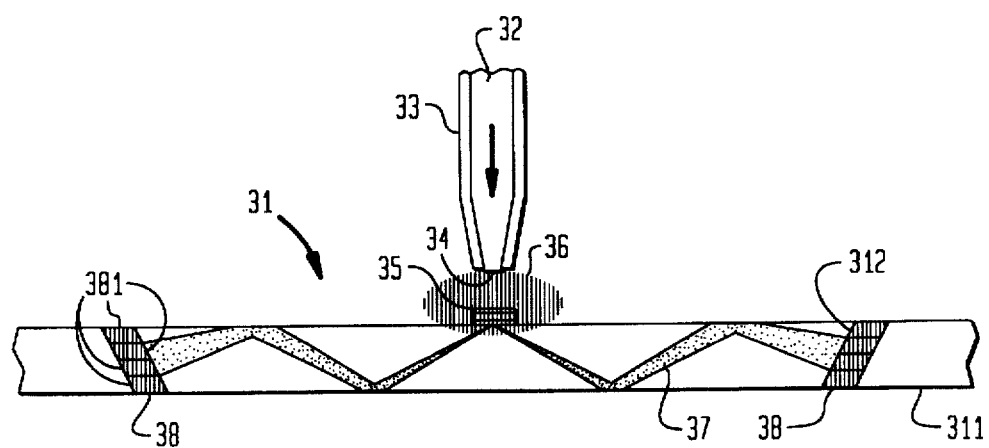
FIG. 3A, B show details of another preferred embodiment of the invention.
Figure 3B:
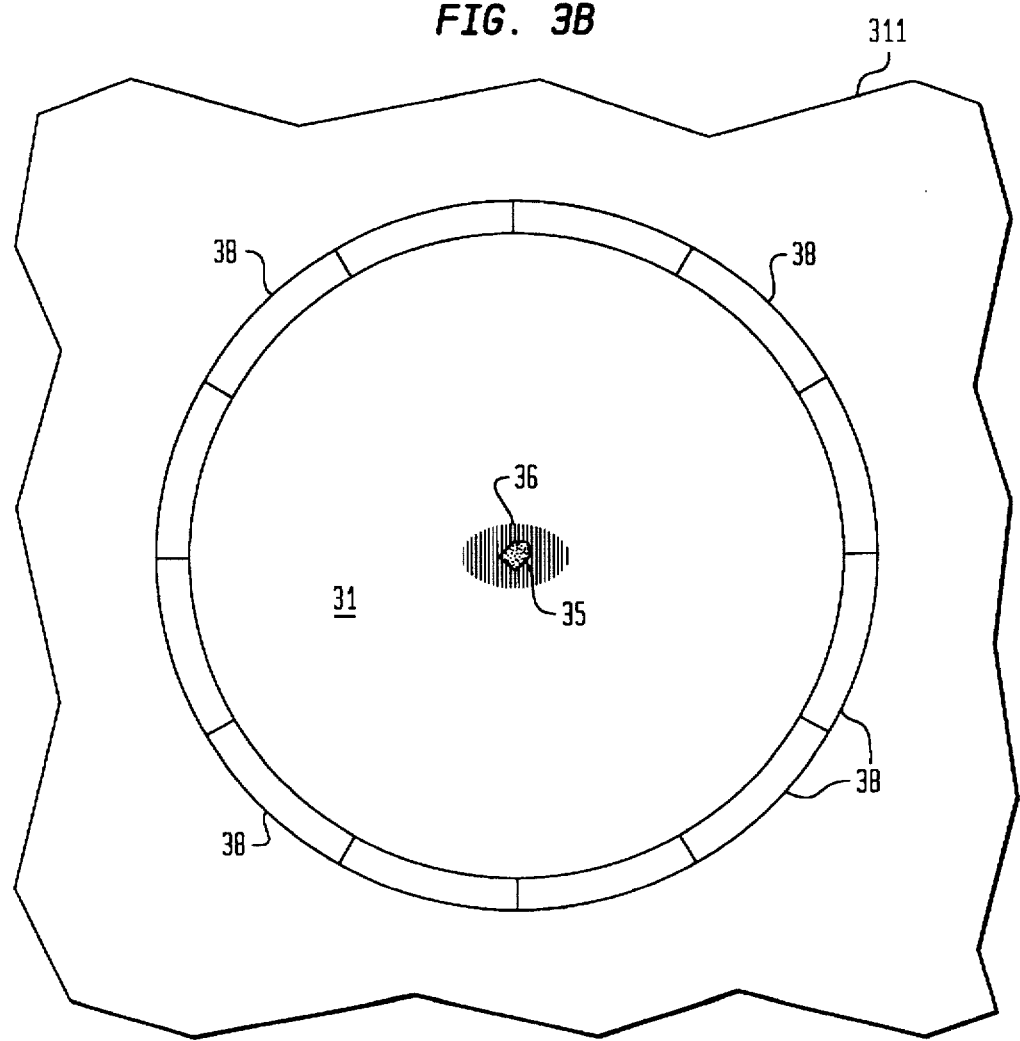

A coated tip with an aperture is applied also in the example illustrated by FIGS. 3A–B, in which FIG. 3B presents a top view of FIG. 3A showing a plane through the sample. The circular sample carrier 31 is adopted to fit into a standard optical stage 311 as found in conventional microscopes. An array of light detectors 38, 381 is arranged at its circumference for detecting the azimuthal distribution of the light emerging from the near-field zone 36 around the sample site 35, i.e. the light intensity at different angles $\phi$. By applying several light detectors 381 at a line perpendicular to the circumference, the variation of the light intensity versus the angle $\theta$ can be measured.

In accordance with the refraction law described above, light emerging at angles larger than $\theta_c$ undergoes total internal reflected at the opposite boundary of the carrier 381. Thus, the carrier is able to guide the light via subsequent total internal reflections, as known from optical fibers. The shaded areas 37 demonstrate this light guiding effect. The range of angles in which light transmits the sidewall 312 of the carrier depends on their geometry and the refractive index of the material. If the sidewall 312 is vertical, light emerging at angles between 41.3° to 48.7° is transmitted when using BK7, the most commonly used optical glass with n=1.515, and between 43.2° to 46.8° in case of quartz glass having an index of refraction of 1.460. The radius of the carrier does not affect this result. By tilting the sidewall 312 by a angle larger than 5 degrees, the whole angular interval of interest, approximately 20 degrees, is transmitted. The sample carrier has a radius of 5.1 mm and a thickness of 1.5 mm.

The detectors 38, 381 can also be efficiently coupled to the transparent sample carrier 31 by providing an optical contact either to the sidewall, top and/or bottom face by applying an optical glue, immersion oil, or other means known to a skilled person to provide a boundary without a sharp transition considering the index of refraction.

As the dimension of the carrier with the detector array is typically smaller than 1 cm, and the diameter of the front end of the tapered fiber 33 does not exceed the order of a few microns, the whole device can be incorporated into a customary optical stage 311 of a lens or confocal microscope.

Figure 4:
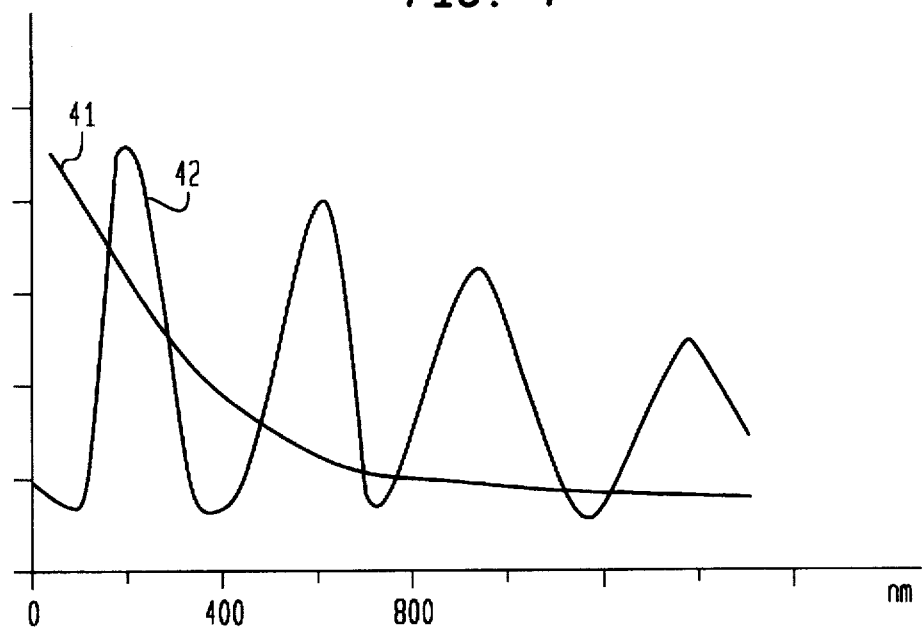
FIG. 4 shows a plot of the detected light intensity versus the distance between sample and the near-field generating tip at different angles of observation.

An important advantage of the light emerging from the neapfield at a angles θ larger than the critical angle $θ_c$ is found to be the strong and unambiguous dependence of its intensity from the distance between the near-field generating aperture and the surface of the sample. This dependence is illustrated by FIG. 4, showing the measured light intensity versus the distance for an angle θ=47°, 41 and θ=0°, 42, i.e. transmission along the axis perpendicular to the surface of the sample. The light transmitted in normal direction shows pronounced modulation, preventing a use of the signal for distance controlling purposes. On the other hand, the light emerging from the near-field at an angle larger than the critical one shows a smooth exponential increase. Thus, by using the measured light intensity 41 as input for the distance control circuit 6 (see FIG. 1), a feedback loop is easily realized enabling an accurate control of the height of the tip during the scanning of the sample.

The resolution and contrast of the measurements can be further improved by using phase sensitive superposition (interference) of light emerging from different angles. Superposing the light emerging at θ=55° but at opposite azimuth angles φ by using suitable positioned mirrors and beamsplitters results in a detected signal proportional to $$P(55°) + P*(55°) + 2\sqrt{P(55°)P*(55°)} \cos(ψ - ψ* - Δψ).$$

Herein, the angular power density is denoted P and P* for both azimuthal directions, respectively, and (ψ—ψ*—Δψ) is the phase difference of both light beams, enlarged by an additionally induced phase shift Δψ. By inducing a phase shift Δψ=180°, the signal vanishes in the absence of the sample. Thus, the sample itself can be imaged with a higher contrast and resolution than by observing merely the light intensities.

We claim:

1. A near-field optical microscope comprising transparent sample carrying means (21, 31) having a supporting face for a sample (25, 35) with a critical angle $θ_c$, near-field means (2–7, 22–24, 32–34) for generating a near-field (26, 36) of light adjacent to said supporting face of said sample carrying means, and positioning means (4–7) for adjusting the distance between said supporting face and said near-field means, characterized by light detecting means (8, 28, 281–283, 38, 381) for measuring the intensity of light including light emerging at an angle θ larger than the critical angle $θ_c$, said angle θ being measured from the normal to said face.

2. Microscope in accordance with claim 1, wherein the near-field means comprises a light propagation medium (2, 22, 32) with a tapered end portion.

3. Microscope in accordance with claim 1, wherein the near-field means comprises a light propagation medium (2, 22, 32) with a tapered end portion covered by an opaque material (23, 33) leaving a narrow aperture (24, 34) at the apex of said tapered end portion.

4. Microscope in accordance with claim 1, further comprising scanning means (4–7) for moving the near-field means and the sample carrying means relatively to each other in at least one direction parallel to the supporting face.

5. Microscope in accordance with claim 1, wherein the sample carrying means comprises light coupling means (211, 31) for propagating light emerging from the near-field at an angle θ larger than the critical angle $θ_c$ towards the light detecting means.

6. Microscope in accordance with claim 1, wherein the sample carrying means comprises light transparent coupling means (211, 31) for propagating light emerging from the near-field at angles θ larger than the critical angle $θ_c$ towards the light detecting means, and wherein the light detecting means comprises an array of detectors (281–283, 38, 381) attached to said sample carrying means either directly or through further light propagating means for enabling a simultaneous measurement of the intensity of light emerging at different angles θ and/or different azimuthal angles φ.

7. Microscope in accordance with claim 1, wherein the sample carrying means comprises light transparent coupling means (211, 31) for propagating light emerging from the near-field at angles θ larger than the critical angle $θ_c$ towards the light detecting means, and wherein the light detecting means comprises an array of detectors (281–283, 38, 381) attached to said sample carrying means either directly or through further light propagating means for enabling a simultaneous measurement of the intensity of light emerging at different angles e and/or different azimuthal angles φ and means for adding/subtracting the outputs of said array.

8. Microscope in accordance with claim 1, wherein the sample carrying means comprises a hemisphere (211) with a flat face (212) as the supporting face, said hemisphere being made of transparent material for propagating light emerging from the neapfield at angles θ larger than the critical angle $θ_c$ towards the light detecting means.

9. Microscope in accordance with claim 1, further comprising means for phase-sensitive superposing light emerging from the near-field at different angles θ and/or different azimuthal angles φ.

10. Microscope in accordance with claim 1, wherein the sample carrying means comprises a, preferably circular, plate (31) with plane-parallel faces, one of which being the supporting face, and a side face (312) tilted from the direction perpendicular to said plane-parallel faces, said plate being made of transparent material for propagating light emerging from the neapfield at angles θ larger than the critical angle $θ_c$ towards the light detecting means.

11. Method of near-field optical microscopy, comprising the steps of placing a sample onto sample carrying means, generating a near-field of light at said sample, and measuring the intensity of light emerging from the near-field in a direction differing from a plane defined by the sample at angles θ larger than a critical angle $θ_c$.

12. The method of claim 11, further including measuring the intensity of light emerging from the neapfield at angles θ less than 15 degrees larger than the critical angle $θ_c$.

13. The method of claim 11, wherein the measured intensity of light emerging from the near-field at angles θ larger than the critical angle $θ_c$ is used to control the distance between the surface of the sample and near-field generating means.

14. The method of claim 11, wherein the light emerging from the near-field at two different angles θ and/or different azimuthal angles φ is phase-sensitively superposed before measuring its intensity.

* * * * *